(12) United States Patent
Dalli et al.

(10) Patent No.: US 11,256,975 B2
(45) Date of Patent: Feb. 22, 2022

(54) DISTRIBUTED ARCHITECTURE FOR EXPLAINABLE AI MODELS

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/314,335

(22) Filed: May 7, 2021

(65) Prior Publication Data

US 2021/0350211 A1    Nov. 11, 2021

Related U.S. Application Data

(60) Provisional application No. 63/021,230, filed on May 7, 2020.

(51) Int. Cl.
| | |
|---|---|
| *G06N 3/04* | (2006.01) |
| *G06N 10/00* | (2019.01) |
| *H04L 9/06* | (2006.01) |
| *H04L 9/00* | (2006.01) |

(52) U.S. Cl.
CPC ......... *G06N 3/0454* (2013.01); *G06N 3/0427* (2013.01); *G06N 3/0472* (2013.01); *G06N 10/00* (2019.01); *H04L 9/008* (2013.01); *H04L 9/06* (2013.01); *H04L 2209/08* (2013.01); *H04L 2209/16* (2013.01); *H04L 2209/46* (2013.01)

(58) Field of Classification Search
CPC .... G06N 3/0454; G06N 3/0472; G06N 10/00; G06N 3/0427; H04L 9/008; H04L 9/06; H04L 2209/16; H04L 2209/08; H04L 2209/46
See application file for complete search history.

(56) References Cited

U.S. PATENT DOCUMENTS

| | | | | |
|---|---|---|---|---|
| 2019/0370647 | A1* | 12/2019 | Doshi | G06N 3/08 |
| 2020/0167677 | A1* | 5/2020 | Verma | G06N 5/003 |
| 2020/0279140 | A1* | 9/2020 | Pai | G06N 5/04 |

\* cited by examiner

*Primary Examiner* — Mohammad W Reza
(74) *Attorney, Agent, or Firm* — Maier & Maier, PLLC

(57) ABSTRACT

A method, and system for a distributed artificial intelligence architecture may be shown and described. An embodiment may present an exemplary distributed explainable neural network (XNN) architecture, whereby multiple XNNs may be processed in parallel in order to increase performance. The distributed architecture may include a parallel execution step which may combine parallel XNNs into an aggregate model by calculating the average (or weighted average) from the parallel models. A distributed hybrid XNN/XAI architecture may include multiple independent models which can work independently without relying on the full distributed architecture. An exemplary architecture may be useful for large datasets where the training data cannot fit in the CPU/GPU memory of a single machine. The component XNNs can be standard plain XNNs or any XNN/XAI variants such as convolutional XNNs (CNN-XNNs), predictive XNNS (PR-XNNs), and the like, together with the white-box portions of grey-box models like INNs.

29 Claims, 7 Drawing Sheets

DISTRIBUTED ARCHITECTURE FOR EXPLAINABLE AI MODELS

FIELD

An exemplary embodiment relates to the field of explainable artificial intelligence (XAI), explainable neural networks (XNN), and explainable transformer transducers (XTT).

BACKGROUND

Ensemble learning methods implement diverse models to predict an outcome, either by using multiple modeling algorithms or by using different training data sets. The ensemble model aggregates the prediction of each base model, applying a prediction into one result. One exemplary ensemble method may utilize a voting classifier, whereby multiple classifiers are trained on a specific classification problem. The resulting ensemble classifier may include a voting classifier whereby each base model selects a class and submits it as a vote, and the resulting class is simply the class which receives the most votes.

SUMMARY

According to at least one exemplary embodiment, a method, and system for a distributed artificial intelligence architecture may be shown and described. An embodiment may present an exemplary distributed explainable neural network (XNN) architecture, whereby multiple XNNs may be processed in parallel in order to increase performance. The distributed architecture may include a parallel execution step which may combine parallel XNNs into an aggregate model by calculating the average (or weighted average) from the parallel models. The average may be applied directly on the weights or on the gradients during back propagation. The aggregate model may be formed based directly on the weights of the model, rather than from the result of the individual models. In a similar exemplary fashion, a distributed explainable transformer transducer (XTT) architecture, whereby multiple XTTs may be processed in parallel in order to increase performance, may be created in an alternative embodiment.

It may be contemplated that XAI models, XNNs and XTTs may be interchangeable for one another. A distributed XNN/XTT/XAI architecture may incorporate multiple independent models where one such model, once trained, can work independently without the need to rely on the full distributed architecture, which may be optimized primarily for training purposes. An exemplary architecture may be extremely useful for large datasets where the training data cannot fit in the CPU/GPU memory of a single machine. The component XNNs/XTTs/XAI models can be standard plain XNNs/XTTs or any XNN/XTT/XAI variants such as convolutional XNNs (CNN-XNNs), predictive XNNs (PR-XNNs), text XTTs (T-XTTs) and the like. The component models may also be composed of Interpretable Neural Networks (INNs), which are a generalization of XNNs and XTTs that utilize a black-box predictor together with an XNN-like white-box layer, hence the term grey-box, which may include a hybrid model that has an uninterpretable part (the black-box) wrapped in an interpretable interface (the white-box portion) and that outputs an interpretable output. It may be contemplated that the white-box portion of grey-box systems, such as INNs, may be interchangeable for XNNs and XTTs in this invention. The component XAI models can also be implemented using explainable spiking nets (XSN), explainable memory nets (XMN), and the like, as well as reinforcement learning applications where they may be compatible with explainable reinforcement learning (XRL). The methods described herein may be contemplated to apply to XNNs, XAI models, XTTs, XSNs, XMNs, XRLs interchangeably.

An exemplary embodiment may implement a hybrid deployment where one or more components of the distributed architecture includes an entirety of or a sub-part of an XAI model (obtained via a suitable method, such as an XAI model induction method) and/or an entirety of or a sub-part of an explainable transducer transformer (XTT) and/or an entirety of or a sub-part of an explainable neural network (XNN). An exemplary embodiment may also include action triggers within XNNs/XTTs/XAI models to achieve higher performance, real-time, and quasi-real-time reactions and operations in the XNN/XTT feed-forward operational mode and the non-training operational mode of XAI models. In particular, action triggers may allow distributed XNN/XTT/XAI models to achieve re-entrant and thread safe call functionality and enable modular design concepts and best practices in software and hardware engineering to be applied.

An exemplary embodiment may process neural networks in a distributed manner and may be specifically designed for parallelizing explainable neural networks (XNNs) with the option of enabling hybrid deployments involving a mixture of XAI models and XTTs.

Distributed models, like ensemble methods, may split a dataset into multiple subsets in order to train multiple XNNs/XTTs on multiple datasets. The main difference between ensemble methods and Distributed XAI/XNNs/XTTs is that aggregation of models is done as part of the training process, rather when serving predictions. This is possible since all models are inherently white-box and they all have a similar structure, which enables the aggregation to be calculated as one single model, making it logically equivalent to calling multiple models and then aggregating the results. Ensemble methods may include models of different structures, such as random forest classifiers, which may train multiple decision trees of different structures to get to the final result. Furthermore, ensemble models in conjunction with grey-box or white-box models and an actions and triggers functionality are viewed as enablers that allows for the engineering concepts of modularity, functional, and logical separation to be applied directly to XAI models, INN and XNN networks, XTT transformers and/or transducers and explainable autoencoders/decoders (XAEDs). Furthermore, ensemble models allow symbolic AI architectures like the XAI models, to be seamlessly interconnected and mixed with connectionist AI architectures like INNs, XNNs and XTTs.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
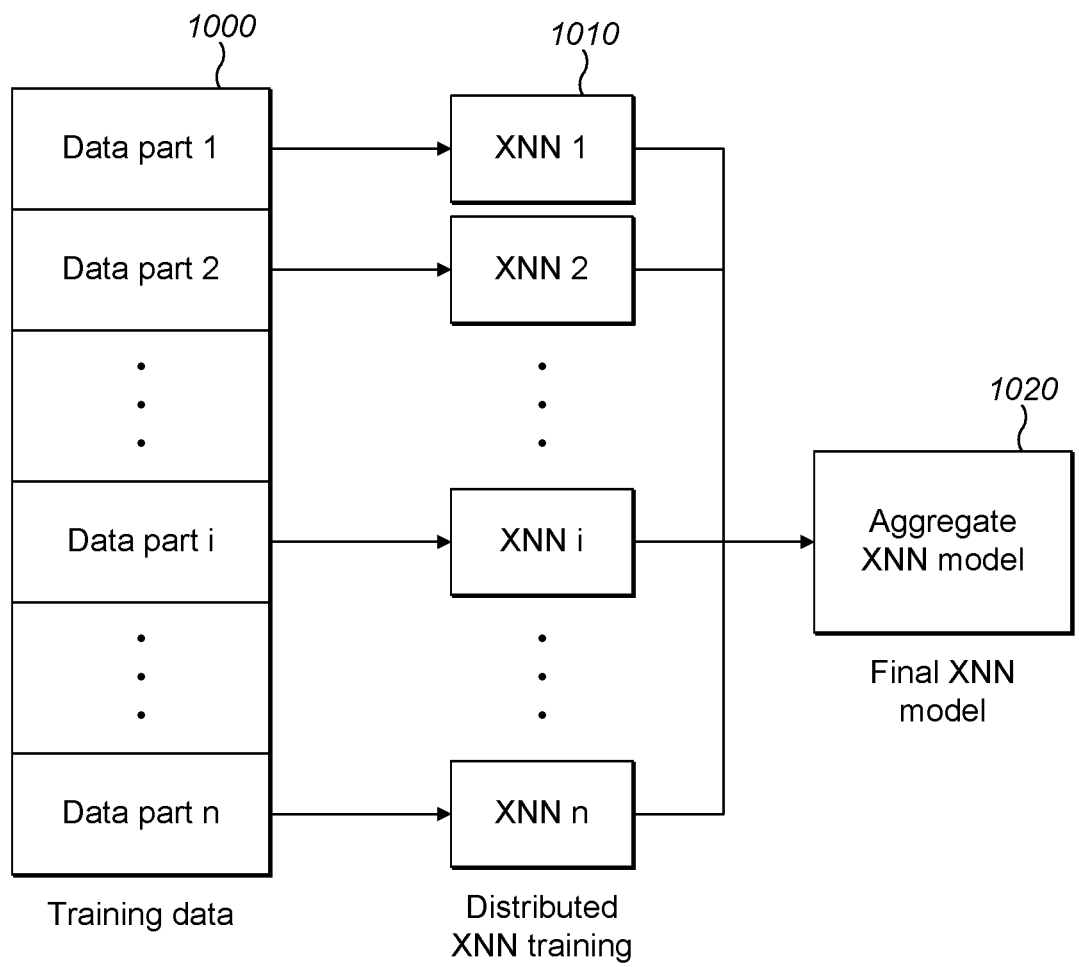
FIG. 1 is an exemplary embodiment of a high-level architecture of a distributed XNN training system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

eXplainable Neural Networks (XNNs) are a new type of white-box neural networks with inherent explainability that give rise to new possibilities for a wide variety of AI systems. XNNs can be fully implemented directly on a GPU using standard deep learning libraries. One caveat is that substantial compute resources are needed to train conventional models, such as large deep learning models and conventional XNN models. Training using a public dataset like ImageNet on a single modern GPU may take weeks. Distributed training on multiple machines may reduce the processing time drastically by aggregating the processing power of multiple machines. In a distributed setting, training is expected to be done proportionally n-times faster, where n denotes the number of data-parts (i.e. distributed components). This is achieved, since training is done completely independent, without the need to synchronize/aggregate weights after each epoch.

An exemplary embodiment focuses on various possible embodiments and implementation of a distributed XNN architecture, whereby an XNN may be trained in a distributed manner on a cluster of machines and GPUs. Referring now to the exemplary schematic flowchart in FIG. 1, a high-level architecture of a distributed XNN training system may be illustrated. The data parts 1000 may be input to a number of XNNs. The result may then be combined to create the aggregate XNN model 1020.

Since an exemplary model may follow the XAI rule-based format, all model variants may be considered as a logically equivalent rule-based format. Hybrid models advantageously allow a distributed system to function in a federated manner. Federated learning may have different hardware and resource capability, which may result in a mix of different models. A mix of XAI models with XNNs and/or XTTs may be desirable, such as when human injected rules in the XAI models are of the type that cannot be readily converted back to XNNs and/or XTTs. Similar situations may arise when the rules do not fit in a practical manner within a connectionist model or are beyond the computational limitations of any of Artificial Neural Networks, Transformers, or Transducers.

An example of such a situation would be in an embodiment where a complex recursive system that contains multiple conditional statements is provided in the XAI model. Such an embodiment may undergo a complex conversion into a PR-XNN, rendering it more difficult to maintain than in the original XAI model rule format. In such cases, it may be desirable to maintain that particular part of the XAI model as an XAI model and use the distributed system to mix and match XNNs and XTTs for the rest of the embodied application. When mixing XAI/XNN/XTT models, a custom aggregation function which combines multiple models into one unified model may be customized to handle the mix of available knowledge.

Although some examples may reference only XTT, XAI or XNN, it may be contemplated that any of the embodiments described herein may be applied to XAIs, XNNs, INNs or XTTs interchangeably, as well as the different XNN variants, such as convolutional XNNs (CNN-XNNs), predictive XNNS (PR-XNNs), and the like, as well as any other logically equivalent methods.

Referring now to the exemplary embodiment in FIG. 1, FIG. 1 may illustrate an exemplary high-level distributed model architecture. An exemplary distributed model may receive some input training data set 1000, which is then split into n partitions 1010. The partitions 1010 may then be split randomly, via some stratification or sampling method or combination of both. Random sampling may be done with or without replacement. Then, for each partition i, an XNN model may be trained independently on a subset of the training data. Common distributed computing frameworks may be utilized to offload the processing on multiple nodes/servers since each task may work independently. It is further contemplated that the exemplary system illustrated in FIG. 1 may be partially or fully implemented as part of a workflow system.

An exemplary embodiment may include a synchronization step, whereby the final XNN model is created by aggregating the parallel XNNs into an aggregate XNN model 1020. When aggregating weights, the synchronization step may occur after a number of training steps. When aggregating gradients, synchronization may occur after each training step. The white-box nature of XNNs allows such an aggregated model to be created. The aggregated model may combine the results from multiple models, using an appropriate combination function, such as an averaging function. Other combination functions such as weighted average or some linear or non-linear combination function or transformation may be utilized depending on the application and suitability.

Figure 2:
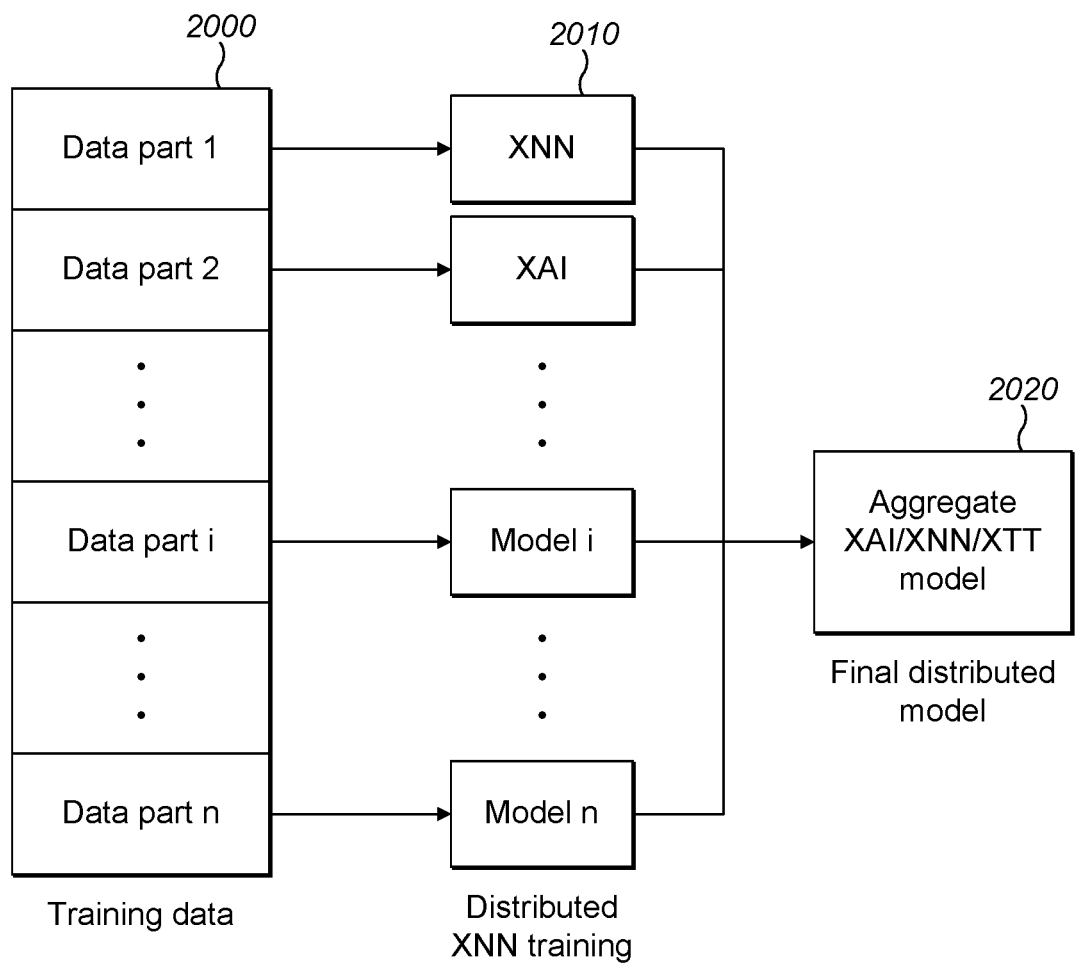
FIG. 2 is an exemplary embodiment of a high-level architecture of a distributed hybrid XNN training system.

Referring now to the exemplary schematic flowchart in FIG. 2, a high-level architecture of a distributed hybrid training system may be similarly illustrated. In a similar manner, hybrid models involving a mix of XAI/XNNs/XTT models may be trained in a distributed manner. Multiple data parts 2000 may be input into n models 2010. The models 2010 may be any combination of XAI, XNN, XTT, or any other contemplated model. An exemplary embodiment may implement multiple different models. For example, one data part may implement an XNN while another data part of the same system may implement an XAI. The models 2010 may then be combined to create an aggregate model 2020. The aggregate model may be any one of an XNN, XAI, or XTT, or may be a hybrid model implementing multiple different models. In an exemplary hybrid architecture, it may be contemplated for all such aggregated models to be logically equivalent; for example, this may be imposed as a requirement to aggregate the models in the hybrid architecture. Alternatively, either some transformations or custom logic may be applied prior to aggregation. Finally, such architecture as depicted in FIG. 2 applies to the training process of the explainable model; however, nothing limits the user of the system to utilize such architecture in a feed-forward manner as well. In a feed-forward manner, the architecture may be used for serving predictions and explanations in a distributed manner. It may be contemplated that such feed-forward function is closer to ensemble methods, with the main difference being that in an exemplary distributed architecture all models are interpretable, and explainability is still retained. In some practical applications, the distributed architecture in feed-forward mode may have various benefits for enhanced performance in complex and very large models. It is further contemplated that the exemplary system illustrated in FIG. 2 may be partially or fully implemented as part of a workflow system.

Figure 3:
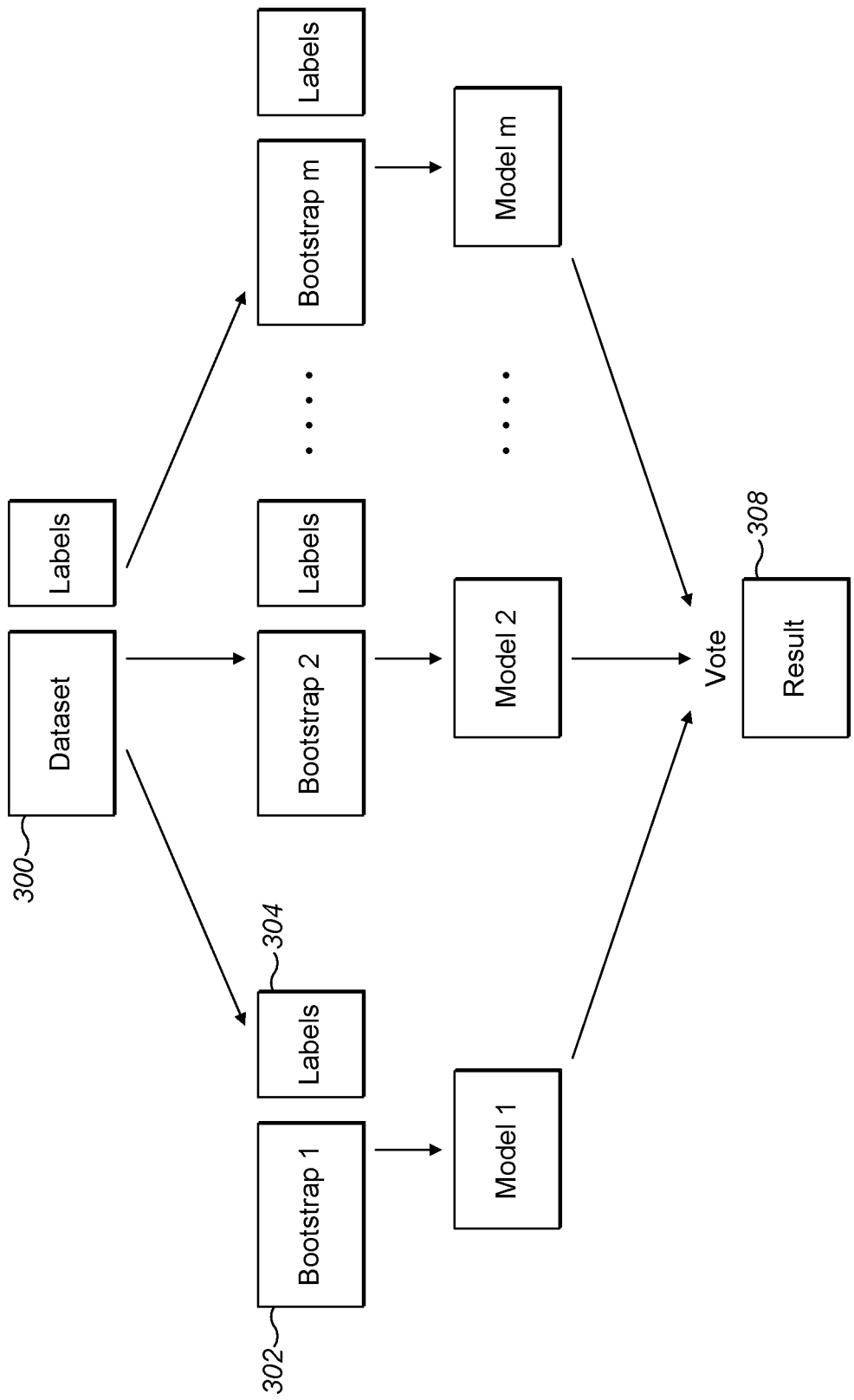
FIG. 3 is an exemplary schematic flowchart illustrating an ensemble model.

Referring now to the exemplary embodiment in FIG. 3, FIG. 3 is a schematic flowchart illustrating ensemble methods as known in the prior art. Bootstrapping is a method of ensemble models, sometimes also called bagging. The concept works by splitting a dataset 300, into m bootstraps (or bags) 302, identified by a label $D_m$ 304. Each bag 302 is then fitted to a model 306 independently, such that the ensemble model includes an aggregate or average of the results of the individual models 306. The aggregation may be analogous to each model "voting" on the end result. The votes are aggregated to produce the result 308.

Distributed XNNs differ from ensemble models in that after training, the individual models may be discarded. Since an XNN is fully white-box and aggregation may be performed directly on the weights of the model, rather than on the result itself, the individual models are no longer needed. Ensemble models have the disadvantage that they require the individual models in order to function and serve predictions, thus forming a black-box system.

Distributed XNNs can be implemented directly as a hardware circuit, which may be implemented either using (i.) flexible architectures like FPGAs, or (ii.) more static architectures like ASICs or analogue/digital electronics, or (iii.) neuromorphic architectures that are suited for the hardware implementation of connectionist models such as XNNs, or (iv.) quantum computing hardware. Different implementations may be intermixed together seamlessly. It is contemplated that dedicated XNN Acceleration Hardware or XNN Processing Unit (XPU) may be available in practical implementations to accelerate parts or all of a Distributed XNN. In an exemplary embodiment, an XPU may be used to accelerate the prediction network or the conditional network or both parts of an XNN. It is further contemplated that an Explainable Processing Unit (EPU) may be used to accelerate the creation and output processing steps involved in creating an explanation in a Universal Explanation Format. In an exemplary embodiment, an EPU may be used by the Distributed XNN to accelerate the creation of a hierarchically structured explanation output, faster linking with an ontological structure, and faster linking with a reverse indexing mechanism for tabular, textual and image data.

Action triggers allow for advanced functionality to be implemented as an extension of artificial neural networks (ANN) with additional advantages that may be achieved via the use of grey-box and white-box models. White-box models may be globally explainable and may also have an interpretable output. Grey-box models may be partially explainable by having some of their components understood by the interpreter of the system and their behavior may be predicted. Like white-box models, grey-box models may have interpretable outputs which also enable explanations to be generated. For action triggers to work, events may be defined in the model that control when triggers eventually trigger the relevant actions. Events may be defined as a set of states or change in states that are caused to occur in conjunction or as specified by some appropriate constraint condition, such as that expressed in a CNF or DNF format, or other suitable format. Events may be defined in XAI models in the form of a rule; in XNNs and INNs in the form of a constraint across nodes and weights (in case of INNs, the white-box part of the INN); and in XTTs in the form of a constraint across nodes, weights and attention status. For example, events may trigger when a particular state is entered or when a node or edge has a particular value or range of values. A trigger may activate when a particular condition is evaluated as being true, which may be known as the trigger condition. Different types of triggers may be called before, during, or after the trigger condition is identified as being true. Triggers may be of a binary or signal type or be associated with an activation function. Furthermore, triggers may have a recency and frequency attribute that either amplifies or dampens the trigger triggering rate according to the previous trigger activation history, optionally in a particular time window.

In a practical embodiment within the aviation industry, an exemplary trigger may be defined as: "if altitude is below a certain threshold, an action should trigger". This action may be defined as an operation (or set of operations) that is called from a trigger that has activated upon receiving the appropriate event (or set of events) and has been activated using the trigger's activation function. The action may perform an external action, change the system status, or raise another event amongst possible implementations. An example of an action may be switching on an alarm and/or an auto-pilot system which is designed to perform a specific job. In an exemplary embodiment, events, triggers and actions can be modelled using a finite state machine or similar type of model that is conditioned to activate when the event conditions in the underlying XNN/INN/XTT/XAI model and the like become true. If multiple actions are possible, they may be ranked using some ranking and selection function or other type of prioritization.

In another exemplary embodiment, triggers and actions can be modeled using a suitable association method and then fed as input to a Deep Learning network together with the underlying model structure, and optionally an initial set of event conditions, to learn or fine tune the event conditions themselves together with any action ranking and selection that may also be performed. Using action triggers, the distributed system may allow XNN/XTT/XAI models to be used modularly, akin to software modules and packages in software engineering, or hardware components and packages in hardware engineering. Action triggers can be used to achieve both non re-entrant and re-entrant calls within the effective modules of the distributed system, and the ensemble functionality and support allows for mixing of XNNs/XTTs/XAI models within the same system. Since re-entrant call functionality is achieved via an exemplary distributed XNN, common concepts such as multi-threading, thread safe calls and thread safety in general can be implemented into an exemplary embodiment. The modular approach allows for best practices in software and hardware engineering to be applied to XNN/XTT/XAI models. This also allows for re-use of the same XNN/XTT/XAI model in multiple systems, solutions and embodiments without needing expensive retraining or additional data.

Figure 6:
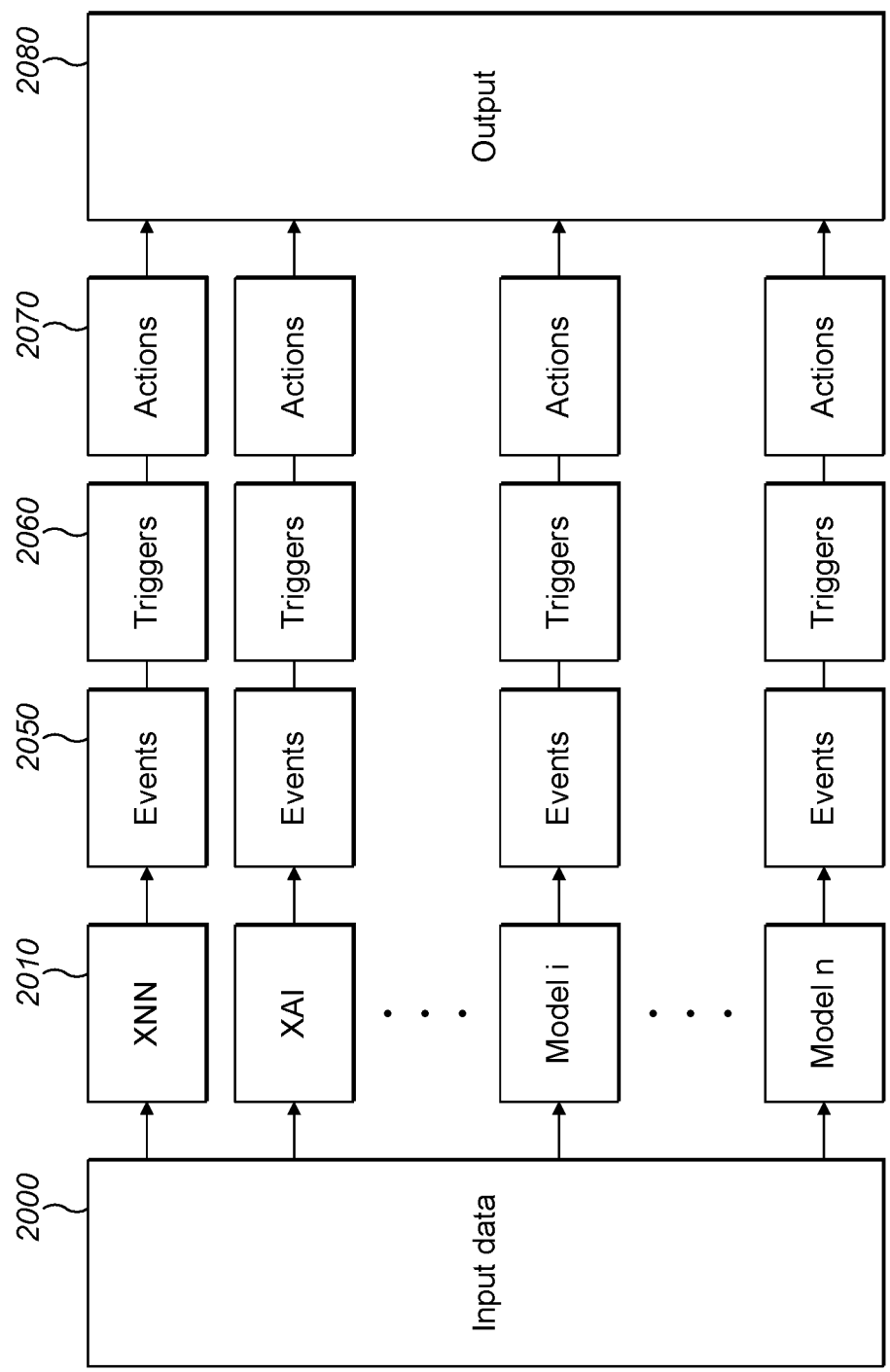
FIG. 6 is a schematic flowchart illustrating a Feed-Forward Distributed Architecture for Events, Triggers and Actions.
Figure 7:
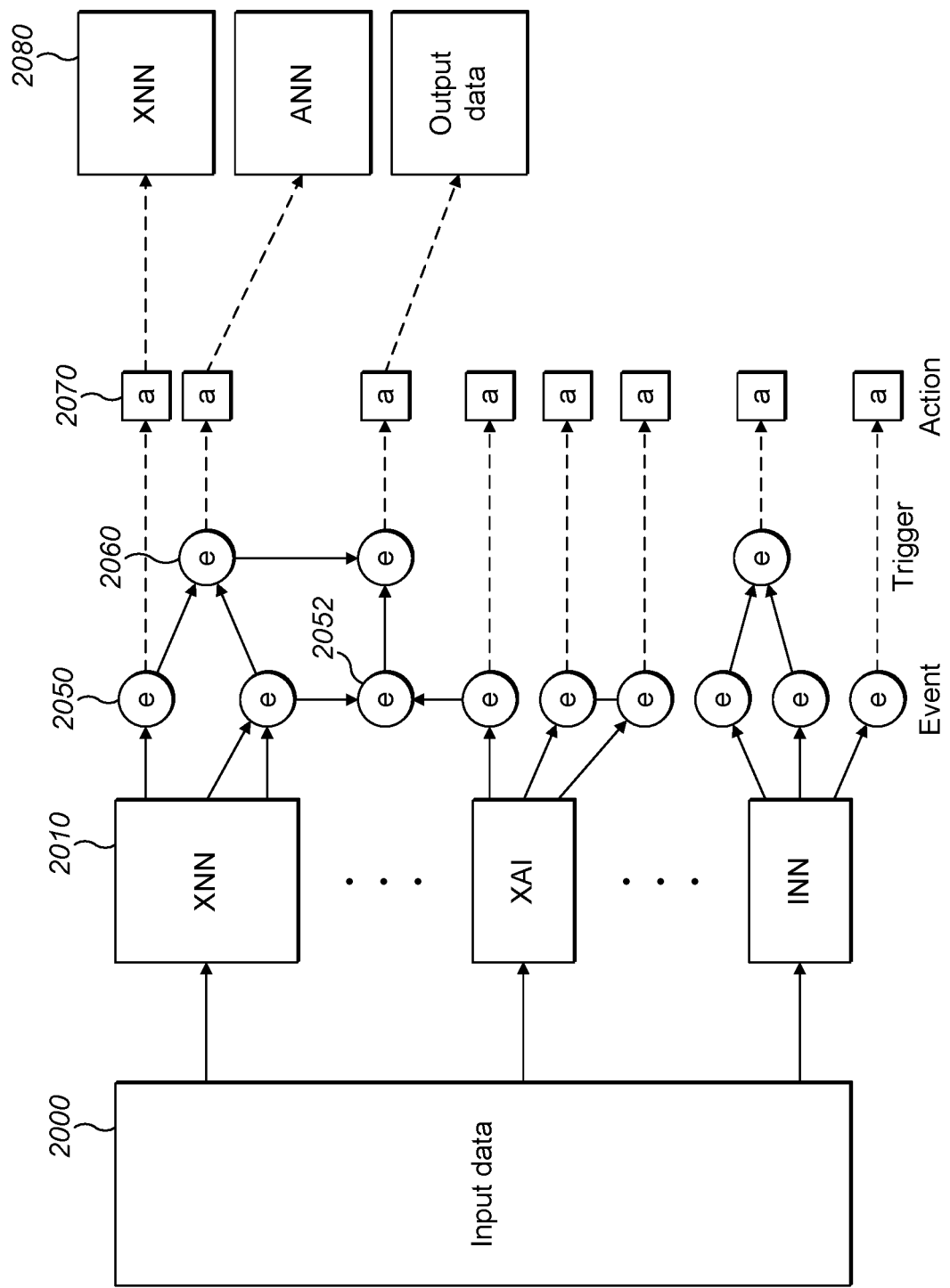
FIG. 7 is an exemplary schematic flowchart illustrating a Feed-Forward Distributed Architecture for Events, Triggers and Actions.

FIGS. 6 and 7 depict an exemplary high-level architecture of events, actions and triggers applied to a distributed explainable system. An exemplary architecture may function by utilizing the white-box nature of XNNs/XAI and other interpretable models such as INNs in a feed-forward manner. Some input data 2000 may be split via some partitioning method, which may be random, via some stratification method, or simply copied to all distributed models. The interpretable models 2010 may process the data and generate an explanation and result. In an exemplary embodiment, all model components may be interpretable, and the system 2010 may satisfy and trigger conditional events, based on some value in the model components, such as neural network neurons, or some event 2050. Referring to FIG. 7, events may be in a hierarchy as shown in step 2052, which may benefit from a network/predecessor analysis when creating a parallel job to identify parallelization bottlenecks in the computation graph. Alternatively, events may be associated with a trigger 2060, triggering an action 2070. Finally, the action 2070, may be a combination of: (i.) the output of some resource or data, and/or (ii.) the input parameters to another model or function, which could be another explainable model, a standard ANN, some transformation function or transformation pipeline, or a different type of computational module or model, such as a module stored in a library developed using an imperative, declarative, functional or object-oriented programming language, or other logical equivalent. The distributed system in feed-forward mode provides the basic building blocks to enable the implementation of Connectionist Engineering techniques.

For example, some exemplary systems may utilize an action call to perform some action on some input. The action may be performed by a system, such as an XAI model independent from the exemplary system. The XAI model may then receive the input, perform the requested analysis, and then return the output to the exemplary system. Additionally, the independent XAI model may also return an explanation of the returned output.

The use of action triggers enables calls in real-time or quasi-real-time without needing to stop the neural network, transformer, XAI model or other parts of the distributed system. Thus, an exemplary embodiment may be amenable to massive scalability and may utilize parallel processing via XNN/XTT/XAI model modules. Action triggers and a distributed model can also apply to all variants of XNNs, including those that use Fast Weights, known as Fast XNNs (F-XNNs). Fast Weights may be used to implement dynamic updates to the weights stored in the edges of a neural network which may be performed at run-time via another sub-network, neural network module or a different neural network entirely. Fast Weight updates may use the output from an artificial neuron to modify the weights stored in an edge connection, for example by adding or subtracting weight values, without needing to use slower update methods, such as gradient-descent based techniques like back-propagation (back-propagation was originally classified as a Slow Weight update procedure). The ability of Fast Weights to utilize and link multiple neural networks simultaneously makes it ideal in a distributed AI application. Fast Weights are a concept still not commonly used in modern AI systems, apart from limited applications in the hidden units of Long Short Term Memory (LSTM) systems and some recursive networks, despite being invented in the early 1990s by Schmidhuber. An exemplary embodiment may implement Fast Weights in an explainable machine learning model or ensemble of explainable machine learning models. Fast Weights combined with action triggers can give a superior boost to runtime performance of the resulting system while enabling it to adapt quickly to changing input dataset distribution and new previously unforeseen training data samples that were not part of the original training dataset. Interpretable Neural Networks (INNs) can also be utilized in the resulting system, as long as the white-box portion of the INN is utilized in the action trigger portion in order to keep the system white-box and interpretable. Due to the white-box nature of exemplary explainable modules and models, an exemplary embodiment may allow for the implementation of Connectionist Engineering techniques that are explainable and built on a clear understanding of each component. When utilizing INN/XNN based approaches, an exemplary embodiment may present a practical solution for neuro-symbolic AI systems, effectively combining connectionist models, typically being implemented as neural networks, with ideas and concepts from symbolic AI.

To expand on what may be entailed by "Connectionist Engineering techniques" further, artificial intelligence techniques have traditionally been classified into two different categories, "symbolic" AI techniques and "connectionist" AI techniques. Symbolic AI approaches have focused around encoding a specific model or representation of the problem and then expecting the system to process the input data according to this model in order to provide a solution, typically using some form of logical rules, search strategies, facts and/or knowledge that has also been encoded. Connectionist AI approaches, on the other hand, have focused on AI systems employing a network topology or other appropriate graph structure, and are most commonly represented by the ANN.

Traditionally, symbolic AI approaches have been the only option for ensuring that AI behaviors are verifiable and explainable, when this has not been possible to do with connectionist approaches. Accordingly, symbolic AI has been much easier to engineer. For example, engineering of a symbolic AI solution might require implementation of "branch and bound" techniques in order to provide optimization or constraint satisfaction problems in a partitioned solution space that is easier to handle. Another symbolic AI solution might instead make use of local search techniques, such that the system looks at a close variant of a solution and tries to improve it incrementally, occasionally performing random jumps in order to ensure that any local optima are escaped or accounted for.

Connectionism, however, has had fewer specific engineering techniques built up around it, since connectionist architectures are based on fewer plans; in a typical connectionist architecture, the user does not specify the rules of the domain being modeled, with the model then training itself based on the provided algorithms and training data. As such, "connectionist engineering" has often amounted to engineering of the inputs of the system or the features of the system, rather than ensuring that the system as a whole will take some particular shape or use some particular architecture. (Most "connectionist engineering," up until the present point, amounts to "feature engineering," where the role of the engineer is to ensure that the system does not have too many features and makes use of a representative data set that covers most of the permutations of those features, due to the general understanding that, due to the possibilities of overfitting and underfitting, a higher number of input features creates a greater and greater risk of a solution that is ultimately invalid.) True "connectionist engineering," where the system as a whole is optimized as a symbolic AI solution might be, may strongly benefit from a system that is explainable and built on a clear understanding of each component, such as is now contemplated.

Figure 4:
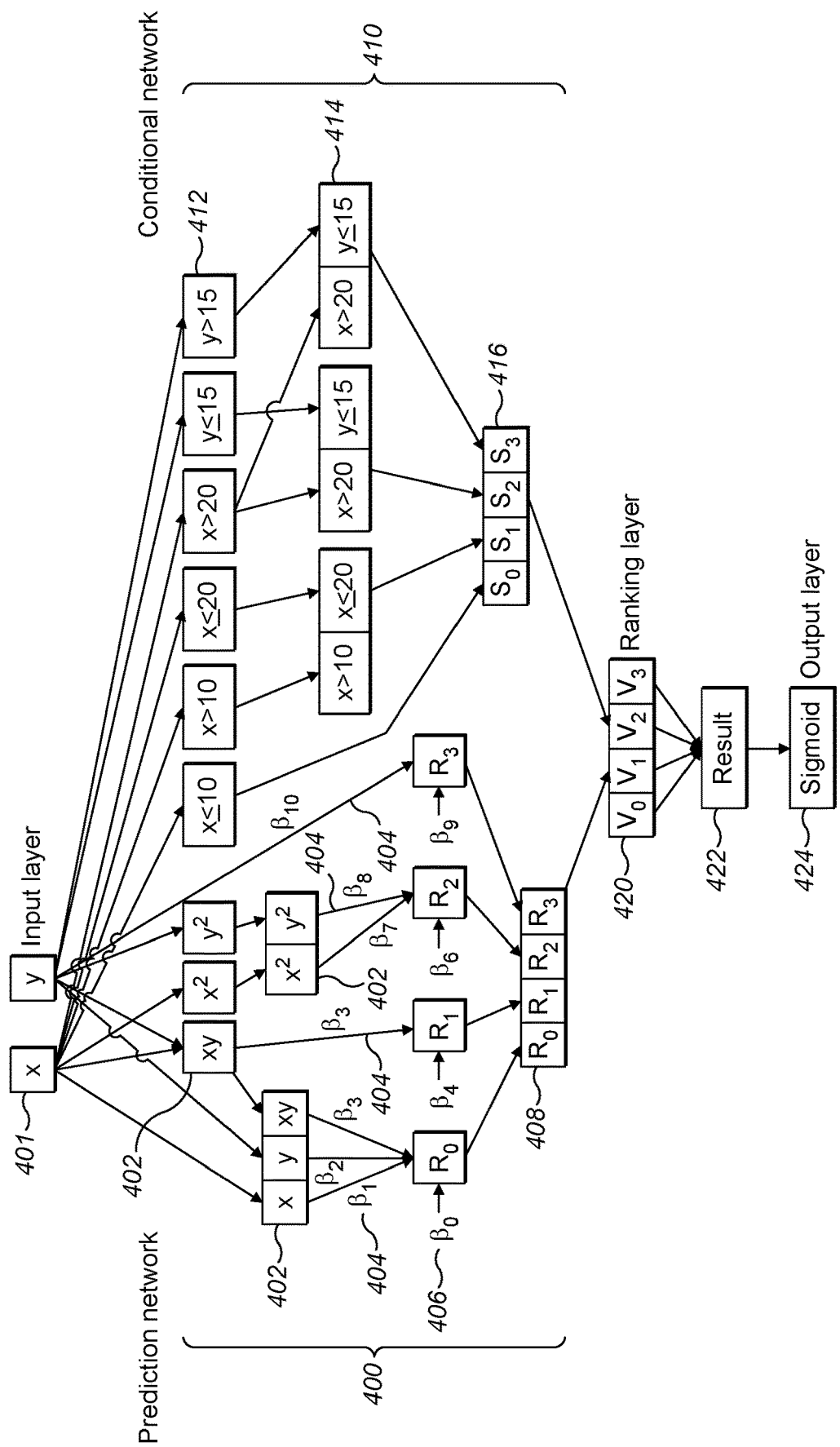
FIG. 4 is a schematic flowchart illustrating an exemplary XNN architecture.

In an exemplary embodiment, a system of equations may be generated from the multiple XNN models. An XAI Model may be generated from a logically equivalent XNN, as shown in FIG. 4. FIG. 4 may provide illustrated definitions for rules $R_0$ through $R_3$ in the form of a prediction network 400. In a prediction network 400, the input features 401 or transformed features 402, such as $x^2$, $y^2$, xy, x, and y, are weighted by the weight coefficients 404 $\beta_0$ to $\beta_{10}$, in order to produce the rules 406 $R_0$ through $R_3$. The resulting values for rules $R_0$ through $R_3$ may be combined and/or output into a value output layer 408.

A conditional network 410 defines the conditional portion of the ruleset. The conditional network 410 may include three main layers that can be combined depending upon the implementation constraints. The conditional layer 412 is initialized according to the hierarchy of partitions being implemented in the XNN. The aggregation layer 414 is initialized for the first time by the process that defines the XNN and can be subsequently refined using gradient descent methods such as back propagation. The conditional network may be trainable or non-trainable. In an exemplary embodiment of the latter case, when applying back-propagation, the partitions may remain static and only the value/prediction network may be refined.

The conditional layer 412 may be initialized through the "if" conditions defined in the XAI model. For example, "if x≤10" may be defined in the XAI model and will generate a neuron in the transformed XNN model for x≤10. An "if" condition with x>10 and x≤20 will generate the aggregated neuron in the aggregation layer 414 for [x>10, x≤20]. The output of each neuron may be either 1 or 0. The switch output layer 416 combines the results of the aggregation layer 414 and conditional layer 412 together.

As illustrated in exemplary FIG. 4, each condition may be split into partitions. Each neuron in the conditional layer 412 may represent a single partition. For example, "y>15" may be a single partition, representing a single rule which applies where "y>15" (and, thus, not in the alternative case where y≤15). Then, the partition may be combined with another partition in the aggregation layer 414. In the aggregation layer 414, the partition "y>15" is combined with the partition "x>20". These two partitions are then combined to create S3, in the switch output layer 416.

The resulting combination may produce a set of values 420, V0 to V3 in this exemplary embodiment. The set of values 420 may be further modified by the weights P0 to P3, in order to produce a result 422. The weights may also or alternatively be non-trainable and set to a fixed value of 1. The decision on what weights can be trainable (and thus changeable by the AI system) and what is non-trainable (and thus non-changeable by the AI system) can always be made under human control and supervision. Finally, the result may be modified by an activation function 424.

Figure 5:
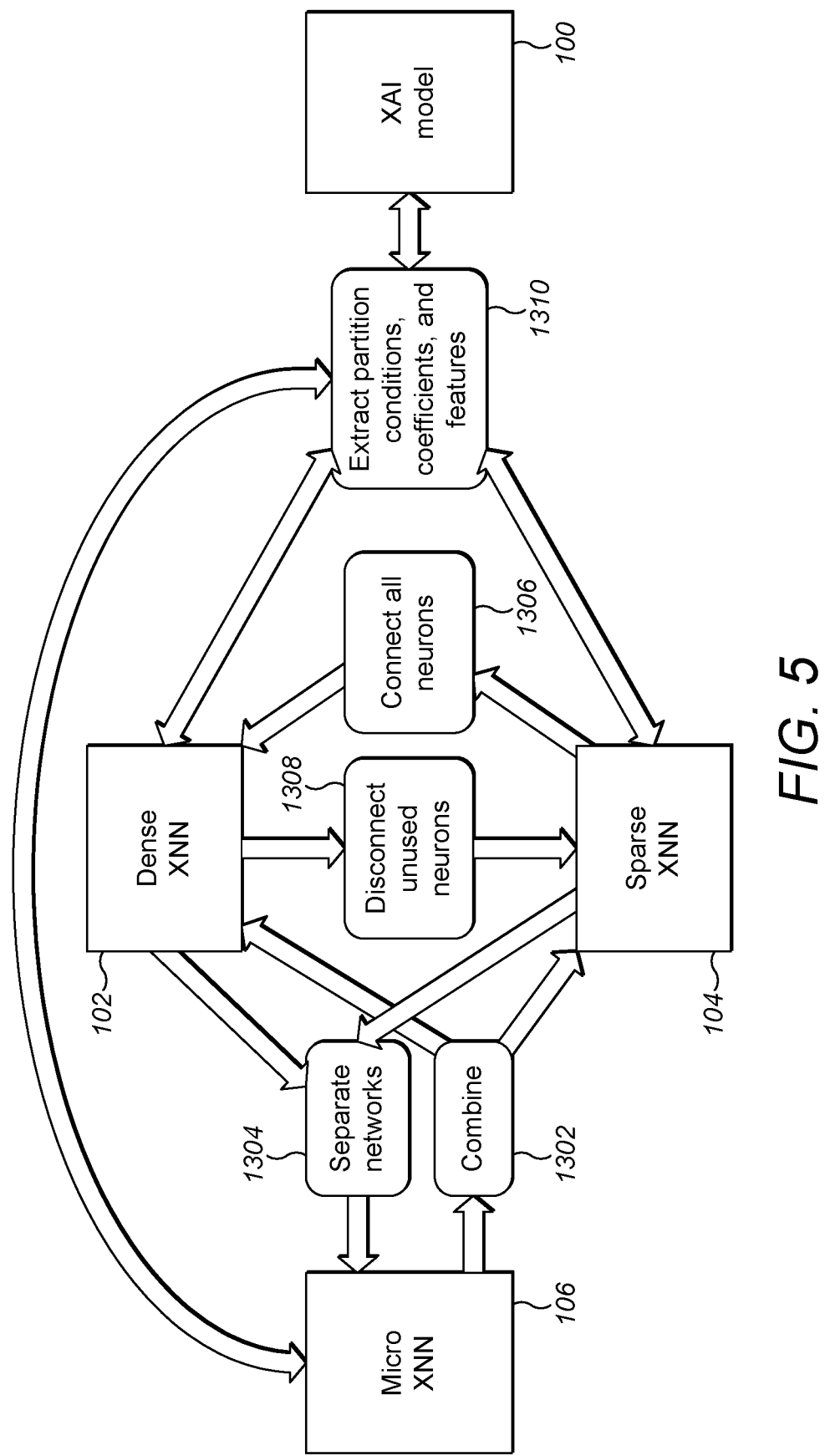
FIG. 5 is an exemplary schematic flowchart illustrating some possible conversions between XAI and XNN variants.

Multiple conversions between XAI and XNN models and variants may be possible. Referring now to the exemplary embodiment in FIG. 5, FIG. 5 is a schematic flowchart summarizing some possible conversions between XNN variants and an XAI rule-based model. As previously described, an exemplary micro XNN 106 may be converted into a sparse XNN 104 or a dense XNN 102 by simply combining 1302 the micro networks that make up the micro XNN 106. Alternatively, a dense XNN 102 or sparse XNN 104 may be converted into a micro XNN by separating 1304 the conditional network 410 from the prediction network. Neurons in the prediction network may be further separated into individual micro networks as well, and the set of micro networks may jointly operate as a micro XNN 106. Other types of conversions may be possible but not shown in FIG. 5, which covers typical application cases that have been encountered during the invention process.

In an exemplary embodiment, a sparse XNN 104 can be converted into a dense XNN 102 simply by connecting 1306 every neuron in every layer of the prediction network, and by inserting coefficients which were previously unused or have 0 value. The reverse can be accomplished, and a dense XNN 102 may be converted into a sparse XNN 104 by disconnecting 1308 the unused neurons which have the coefficient 0.

The XNN conversion process can also convert an XNN back to an XAI model, including an exemplary rule-based XAI model. Since XNNs have a white-box architecture, the neurons, weights and connections can be directly mapped to a rule-based XAI model or a logical equivalent 1310. Such a transformation from an XNN to an XAI model works by first extracting the partition conditions from the conditional network 410, and then extracting the coefficients 304 along with the input/transformed features 401/402. Such coefficients and features may be used to generate the linear or non-linear equations as defined by the general rule-based XAI model. The resulting XAI model will be a logical equivalent of the original XNN and can be reconverted back to an XNN and vice-versa without loss of information or functionality. Additionally, it may be contemplated that an XAI model can incorporate features from multiple XNNs, with each being assigned its own section in the XAI model and having a fusion process that fuses information from each XNN into a combined XAI model. Such a combined XAI model may be reconverted back to a larger XNN if all the rules are compatible with encoding in a single conditional layer of the XNN, or a network of XNNs that are combined within one larger XNN.

In an exemplary Distributed XNN embodiment, let $f_i(x,y)$ represent the exemplary XAI rule-based function for each n data parts. A splitting function may involve various sampling and/or stratification methods, which may result in n parts. The resulting n parts may contain the entirety of the input data for a lossless conversion into a distributed architecture.

Alternatively, the resulting parts may contain a sub-set or part of the input data for an approximate conversion. Approximate conversions may be useful when a quick prototype or preview system is needed or to further compress the resulting system and potentially gain further performance gains while reducing training. The n data parts may also be disjointed or overlapping.

Referring back to the embodiment in exemplary FIG. 1, FIG. 1 illustrates a disjoint stratification of the input data, thus forming a permutation and grouping of the input dataset into n parts. However, an overlapping choice of partitions, where one or more items from the input data may be repeated in the resulting n partitions, is also possible and useful in certain applications where the dataset is split across multiple servers, or in a loosely connected distributed system or some other form of distribution or federation of data. The resulting distributed system resulting from overlapping n data sets may magnify or emphasize certain parts of the input dataset, although this may be counteracted by the appropriate use of weighted aggregation functions. Additionally, XAI and XNN may allow for the implementation of bias detection and strength and weakness detection used in conjunction to identify any distortions introduced in the resulting distributed architecture system as a result of the stratification method.

Once the data is split into n parts, an XNN model may be trained in parallel for each n data parts, such that the $i^{th}$ data part creates the $i^{th}$ XNN model.

$$f_i(x, y) = \begin{cases} \text{Sigmoid}(\beta_{i,0} + \beta_{i,1}x + \beta_{i,2}y + \beta_{i,3}xy), & x \le 10 \\ \text{Sigmoid}(\beta_{i,4} + \beta_{i,5}xy), & x > 10 \wedge x \le 20 \\ \text{Sigmoid}(\beta_{i,6} + \beta_{i,7}x^2 + \beta_{i,8}y^2), & x > 20 \wedge y \le 15 \\ \text{Sigmoid}(\beta_{i,9} + \beta_{i,10}y), & x > 20 \wedge y > 15 \end{cases}$$

The final XNN model may be created by combining the n XNNs together. The aggregated model identified by $f_a(x,y)$ may be calculated by applying a combination of the n functions via an appropriate combination function. For example, the mathematical average may be used as a straightforward combination function.

$$f_a(x, y) = \begin{cases} \text{Sigmoid}(\theta_0 + \theta_1 x + \theta_2 y + \theta_3 xy), & x \le 10 \\ \text{Sigmoid}(\theta_4 + \theta_5 xy), & x > 10 \wedge x \le 20 \\ \text{Sigmoid}(\theta_6 + \theta_7 x^2 + \theta_8 y^2), & x > 20 \wedge y \le 15 \\ \text{Sigmoid}(\theta_9 + \theta_{10} y), & x > 20 \wedge y > 15 \end{cases}$$

The coefficients are represented by $\theta_j$ such that $j \in \{0 \ldots k-1\}$ where j identifies the $j^{th}$ coefficient and k is the total number of coefficients. In the exemplary embodiment, k=11.

Therefore, the average may be calculated as:

$$\theta_j = \frac{\sum_{i=1}^{n} \beta_{i,j}}{n}.$$

In an alternate embodiment, the aggregate model may also be composed of a weighted average, where $w_j$ represents the set of weights and:

$$\theta_j = \sum_{i=1}^{n} \beta_{i,j} w_j$$

Such that:

$$\sum_{j=0}^{k-1} w_j = 1$$

The weights $w_j$ may be determined in several ways. One method to determine the value of $w_j$ is through strength and weakness detection in the dataset. The strength/weakness in each data part may be determined by evaluating the accuracy, precision, mean squared error, or some other metric. Further, a combination of multiple metrics may determine the weights.

The weights $w_j$ may be calculated such that the data parts with the highest strength get larger weights, whereas, parts with weaker data get a lower weight, such that the total sum of all weights should always be equal to 1 in order to obtain an aggregated model with a weighted average.

In another embodiment, averaging of gradients may also be done during the back-propagation process. Gradients may be calculated during the backward (training) pass of an XNN, using back-propagation or other suitable gradient-descent technique. Gradients may be used to determine the rate of change and how the XNN weights should be adjusted. In exemplary an exemplary Distributed XNN, the backward pass distributed process may be implemented in multiple ways. In a first exemplary embodiment, multiple XNNs may be trained independently on different sub-parts of the data, and the weights from the multiple XNNs may be aggregated in a final step, for example, by taking the mean. Such an embodiment may present a performance advantage by not requiring synchronization with every training step, as synchronization may be done at every X training steps. In a second exemplary embodiment, Distributed XNNs may also be processed such that each network processing different sub-parts of the data are synchronized together using gradients from multiple XNNs. Synchronization may be done with every training step or every Y training steps. Aggregating the gradients allows the Distributed XNNs to adjust weights globally with every training or synchronization step. A suitable aggregation function, such as mean, summation or some other suitable aggregation function may be used to combine the weights from multiple XNNs during such synchronization. In a third exemplary embodiment, a combination of the two aforementioned exemplary embodiments may also be implemented. For example, distributed training may start off using the first exemplary embodiment (by averaging weights), and then switch to the second exemplary embodiment (averaging or summation of gradients) to further refine the weights of the Distributed XNN.

In another embodiment, the data splits or dataset parts may not be available at the same time. In an exemplary machine learning system, a model may be trained on some dataset $X_1$. New data $X_N$ may become available at a later stage, thus the new data $X_N$ is combined with $X_1$ such that the combined dataset becomes $X_2 = X_1 \cup X_N$. The machine learning model may then be retrained using the new dataset $X_2$. With Distributed XNNs, the original XNN may be trained on $X_1$. When new data arrives, a new XNN may be trained just on $X_N$. The resulting model becomes the combined distributed XNN model using $X_1$ and $X_N$. The models may be combined by averaging the weights or coefficients of the two XNNs. A weighted average may be applied to control whether to give more importance to the older or newest dataset. Once the models are combined, the combined model may also optionally include additional training epochs on the full dataset $X_2$ to further smoothen the model.

Other linear and non-linear combination functions, and/or combinations of transformations may be applied to combine the results from multiple partitions and sub-parts of the distributed architecture. When implementing hybrid models, conversions and/or custom functions and handlers may be applied to aggregate the relevant XAI/XNN/XTT models.

For example, in one exemplary application, distributed XNNs may be used to detect abnormal patterns of data packets for a telecom company operating in multiple regions. In this exemplary application, the dataset may be too large to fit on a single machine. Therefore, the dataset may be split, for example being split randomly into n data parts; alternatively, it may be split according to some stratification method, for example, into n data parts corresponding to n regions with one part per region.

Once the n XNNs corresponding to the n data parts are trained in parallel, the individual XNN models may be combined into a single model. In one exemplary embodiment, the final aggregate model may simply aggregate the coefficients of then XNN models. However, in another exemplary embodiment, a weighted distributed model may be provided in which the weight for each partition is determined. A simple way of assigning the weight may involve calculating the accuracy for each of the n data parts. The accuracy scores of each n data part may then be ranked in order of accuracy and assigned a weight proportional to the total accuracy, such that the higher the accuracy, the higher the value of the weight, while keeping the sum of all weights equal to 1.

During the weighting process, for example, it may be noted that a specific data part is extremely weak. The weight contribution should automatically penalize that particular data part. Alternatively, low-performing data parts may be automatically eliminated such that the final aggregated model would ignore the result of the data part completely.

An exemplary process also helps identify the strength and weakness in the data. The weakness may introduce unintentional bias which may cause the model to perform poorly. The creator of the model may utilize this information to improve the data collection process or fix the weakness in the data and enhance the resulting model performance with better generalization.

It may be further contemplated that in some cases, such as safety boundaries, ethical applications and safety applications, the incorporation of automated and human provided rules and information may prove beneficial to a Distributed XNN application. A secure processor, secure crypto-processor, hardware security module, trusted platform module or appropriate hardware device may be used for such an implementation. An exemplary application may be in a factory or warehouse which may, for example, utilize autonomous robots that adapt to changing environments, where people may come into close vicinity of such robots. The safety parameters loaded into the robot's behavioral model, linked to the explainable system controlling the robot, may be coded in a secure processing hardware environment to provide an element of tamper proofing, since tampering in such an application may lead to potentially unsafe situations for the people physically interacting with and working near the robots.

An exemplary embodiment may implement an exemplary Distributed explainable system in conjunction with Behavioral Models to provide further assistance in the formal analysis of the system behavior and guarantee predictability of the system. An exemplary behavioral model may include behavioral conditions, events, triggers, and actions. The model may be based on attributions and information retrieved from internal states of the underlying model, or from the output of the computation of the associated model. The output may include any related meta information related to the underlying model. The attributions and information retrieved from internal states of the underlying model may be, for example, the coefficients associated with the weights or features of a local model. The behavioral model may also identify the probability that one or more of the local models will be activated. An exemplary embodiment may provide the probabilities that one or more execution paths through the partitions or local models will be activated.

An exemplary embodiment may implement exemplary Distributed explainable system methods and techniques within a neuromorphic hardware architecture. Explainable models such as Distributed XNNs may enable neural network and artificial intelligence architectures to be made understandable by presenting the white-box models within the Distributed explainable system that can be further presented to people in the form of rules and/or workflows. This surface representation form can be edited and then seamlessly reconverted back into the neural, connectionist format that may be used in order to implement neuromorphic hardware. An exemplary embodiment provides a practical solution for editing, adding, and deleting relevant information and consequently changing the behavior of neuromorphic devices in a controlled, reliable, and replicable manner.

An exemplary embodiment may implement a Distributed XNN using a quantum processing system. It may be contemplated that an explainable model implemented on a quantum processing system may have rules that are similar to explainable models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum controlled not (CNOT), controlled swap (CSWAP), XX, YY, ZZ gates, Pauli gates, Hadamard gates, Toffoli gates and other relevant quantum logic operations that may be combined serially or in parallel.

It may be further contemplated that a Distributed XNN may take further advantage of a quantum processing system to optimize the distribution and parallelism of an implementation by utilizing quantum superposition together with distribution of data.

An exemplary embodiment may use Distributed XNNs within an Explanation and Interpretation Generation System (EIGS), allowing for seamless bi-directional collaboration to be achieved within an EIGS based system.

Other possible hardware implementations and embodiments of Distributed XNNs may be contemplated, including currently available hardware such as surface mounted chip architectures, optical computing architectures, optical-electric hybrid architectures, memristors and quantum computing components. The principles outlined herein fully apply in the hardware implementation of Distributed XNNs on such architectures. An exemplary embodiment may implement a hybrid solution involving a mix of technologies with conventional general processing hardware such as standard CPUs, graphical processing units (GPU), and tensor processing units (TPU). It may be contemplated that the choice of specific hardware implementation may be guided by the specific application where the Distributed XNNs will be deployed.

In an exemplary embodiment, Distributed XNNs may also be used as the basis of a practical data privacy preserving AI system implementation. Data privacy may be violated intentionally or unintentionally by AI systems in a number of scenarios: (i.) personal data from training datasets ends up incorporated in AI models; (ii.) personal data can be re-extracted or re-created by analyzing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, can be combined with private information to re-create or otherwise identify private information. The main data privacy preserving solutions for AI can be classified under four categories: (i.) differential privacy; (ii.) secure multi-party computation; (iii.) federated learning; (iv.) homomorphic encryption. XNNs enable practical implementations under all four categories.

In privacy preserving solution (i.), differential privacy, the introduction of noise in the training data or some other suitable means of obfuscation generates a controllable amount of privacy through a noise factor or ratio in the AI model. Distributed XNNs, with their selective deletion and editing capabilities, can add such noise selectively according to a data privacy model. It may be further contemplated that Distributed XNNs can also selectively add noise to particular samples or slices of data in an independent manner, increasing the overall privacy. Data owners have the added advantage of having control over the noise level added to the model, thus making explainable systems a superior solution to what can be achieved via a black-box. Data owners can also selectively give or retract consent and permission to access to part or whole of their data, and have the Distributed XNNs reflect these data permissions. The audit trail functions of a Distributed XNN can also be used to detect an anti-obfuscation attack and generate noisy information on purpose to defeat such an attack to prevent private information from being identified through repeat querying of the same data row.

In privacy preserving solution (ii.), secure multi-party computation (SMPC) may be used to obtain a correct answer while concealing partial information about data yet simultaneously computing the answer using data from many sources. Distributed XNNs can extend SMPC protocols to cover explanation generation apart from answer output. Commonly used protocols for SMPC implementations, such as the SPDZ (or, "speedz") protocol, typically allow operations such as combinations of additions and multiplications between two secretly shared numbers. Distributed XNNs that utilize a polynomial basis for the fit layer and that have hierarchical partition functions that can be described using a sequence of additions and multiplications, are ideal for SMPC implementations. Additionally, due to their white-box nature, Distributed XNNs can be analyzed and tested formally for security and trust building purposes without revealing any secrets. A secure enclave may also be used to decrypt the data in a protected space within the hardware processor, limiting the possibility for other parts of the system to access such data in clear text. An end-to-end hardware implementation of an exemplary Distributed XNN with a secure enclave may be resilient to most forms of data attacks.

In another exemplary privacy preserving solution (iii.), federated learning, an AI model may be jointly trained across various decentralized devices that hold only local data samples. These local data sample might not be shared with other devices, thus limiting, but not completely eliminating, the privacy risk involved. Distributed XNNs may be utilized as a decentralized or federated implementation, and can be implemented in a straightforward manner, for example, in IoT or edge computing applications where messaging options are limited or constrained by the network topology, such as in a mesh network.

In privacy preserving solution (iv.), homomorphic encryption, or homomorphic computing, a protocol such as the Cheon-Kim-Kim-Song (CKKS) protocol, Brakerski-Gentry-Vaikuntanathan (BGV), Brakerski/Fan-Vercauteren (BFV), or the FHEW Fully Homomorphic Encryption protocol (sometimes given the bacronym "Fastest Homomorphic Encryption in the West"), may be used to allow computation on encrypted data without either decrypting the data and also, optionally, using an encrypted AI model. Homomorphic encryption is widely applicable to applications where data privacy is paramount and making use of private data is usually already complex due to regulations, the significance of the data, and security concerns. Homomorphic encryption is also important for applications where the AI model itself and the associated learned information may benefit from remaining encrypted and protected from the data users or owners themselves. Homomorphic encryption schemes may be based on ring algebraic structures, which allow addition-like and multiplication-like operations to be performed, while admitting neutral elements for both operations, for example, natural integers. Homomorphic computing may use an integer polynomial expression to encrypt information and be able to perform computations on the encrypted polynomial.

In an exemplary embodiment, data may be homomorphically encrypted and, depending on the specific application, the Distributed XNN model itself may also be homomorphically encrypted. In an exemplary embodiment using homomorphically encrypted data and a homomorphically encrypted XNN, utilizing CKKS, a secret key and a public key are generated. The public key may be used for encryption and can be shared, while the private key may be used for decryption and may be kept secret, for example, in a secure hardware enclave or similar implementation solution. CKKS, and many other homomorphic encryption schemes, are founded upon the principles of the Learning with Error (LWE) problem, where noisy pairs of data tuples are distinguished from truly random ones, with the noise generally being provided via the public key. The Ring Learning with Error (RLWE) problem is a variant of LWE on algebraic rings. RLWE may utilize much smaller keys and may calculate operations fast enough to allow for practical implementations.

Problems may arise when doing multiplication of encrypted data with encrypted data, which may be a common operation in the prediction network and conditional network of an encrypted Distributed XNN. Essentially, the size of the encrypted data may increase at each multiplication step, making simple RLWE schemes infeasible to use in practice. A practical solution to this issue may be to use a relinearization technique and an evaluation key, which can be made public, that is applied immediately after each multiplication of encrypted data. However, after relinearization, the amount of noise may increase with the number of multiplications that are to be performed. A rescaling technique may be used to manage the overall noise that is allowed in each multiplication step or layer within a neural network.

In an exemplary embodiment, the number of multiplications that will be performed may be known in advance, and may impact the size of polynomial degree used for the encryption. Distributed XNNs may have an inherent advantage in such a homomorphic encryption application, being Wide Neural Networks (WNNs) instead of Deep Neural Networks (DNNs). The number of multiplications needed in a Distributed XNN may thus be significantly lower than for typical neural networks. Additionally, the precise function and significance of each neuron and connection in an exemplary Distributed XNN are precisely known in advance, allowing for homomorphic encryption of the XNN weights to be performed selectively and independently on the model.

In exemplary embodiments where only the data is homomorphically encrypted, further optimizations are possible in practice, giving white-box Distributed XNNs an inherent advantage for such applications. Distributed XNNs can also be readily integrated with homomorphic computing libraries, including but not limited to the HEAAN, SEAL, HElib and PALISADE libraries. The choice and type of functions within the Distributed XNNs can also make them more efficiently implementable for such privacy preserving applications, for example, by utilizing linear polynomial transformations of reasonably low degree whenever possible to further minimize the number of multiplications that are necessary to perform. Distributed XNNs also have the added advantage of being able to build up an encrypted explanation based on the encrypted answer, which can then be decoded safely in the recipient's secure environment. The application of homomorphic computing with hardware based secure Distributed XNN implementations presents a practical way of highly secure AI models that may be utilized in environments and applications involving highly sensitive data and/or models without needing to establish much trust, if any, between the parties involved.

In an exemplary embodiment, an explainable Distributed system creates and transmits a tamper-proof record or set of tamper-proof records to an independent System of Record. An exemplary implementation of a System of Record may utilize a combination of Distributed Ledger Technology (DLT), a private blockchain, a public blockchain, secure audit database, secure audit log system, a trusted platform module (TPM), hardware secure module (HSM), smartcard module, SIM card, or a suitably tamper-proof implementation device. Cryptographic and encryption methods may be applied to enhance the security of such an implementation. Hashing and checksum methods may also be applied to enhance the security of such an implementation. It may be further contemplated that such an explainable system with a tamper-proof System of Record may be implemented in a manner that is compliant with relevant country-specific, industry-specific or international standards, such as FIPS 140, FIPS 140-2, FIPS 140-3, IEEE P1363, IEEE P1619, ISO 19092, ISO/IEC 18014, PCKS, EIDAS, ESSIF and other relevant standards.

In an exemplary embodiment, a Distributed explainable system may allow for selective deletion of particular logical rules or selective deletion of specific components from part of the Distributed explainable system. In an exemplary application, customer records may have to be deleted due to data protection issues and the right to be forgotten or to comply with other data protection regulatory schemes. The white-box nature of explainable models may allow for identification of which partitions, components or connections could potentially be impacted by a removing a specific data point. Analysis may be performed such that the impact is examined locally (on a specific partition) as well as globally (on the entire explainable model). The analysis may incorporate frequency analysis of a specific path trace along partitions, connections and features in order to identify the rarity or commonality of the specified data point.

The trace path analysis may be in the form of a backmap process whereby the output of the neural network is projected back to the input in order to analyze and perform an impact assessment of the partition, feature importance, and data in the explainable model and data via human knowledge injection (HKI) processes, against a number of criteria and thresholds and values set against those criteria. If the impact assessment concludes that such data points will result into different model behavior, various mitigation strategies may be applied. For example, one mitigation strategy may involve updating weights to minimize or take out a path without the need for re-training.

A second strategy may involve updating weights along the connection to minimize or reduce the effect of the data point without needing re-training. A third strategy may involve using Fast XAI extensions to achieve the two other strategies in real-time by updating the explainable model in real-time without need for re-training. A fourth strategy may also involve re-training parts of the model using a modified version of the original dataset which now excludes the selected data points. It may be contemplated that combinations of different strategies may be adopted in tandem. For example, the second and fourth strategies can be combined to remove selected data points, and further update the weights along the explainable model connections to minimize or reduce the effect of the removed data points without needing re-training.

Continuing with the example, an exemplary embodiment may be useful in situations where the data points that have been selected for removal also exhibit unwanted side-effects, bias, privacy violation, or some other form of prohibition. For example, since in XAI/XNN models and other explainable white-box models, the interactions between features are known and traceable throughout the model, in both feed-forward and feed-backward modes, all such interactions stemming from the selected data points for removal can be analyzed and mitigated by re-weighting or some other suitable technique. It may be further contemplated that with an XNN, such mitigation can happen using a combination of re-weighting in the XNN Prediction Network or modification of the Switch Output in the XNN Conditional Network. This XAI/XNN/explainable white-box model-based mitigation also may ensure that proxy data points and proxy features are not erroneously or inadvertently introduced within a mitigated machine learning model.

Unlike black-box models, XAI/XNN models may eliminate the need to retrain the entire model from scratch, which in some cases may not be practically possible. Other impact assessment strategies may be implemented according to the specific embodiment and application considering domain specific processes and knowledge as may be applicable. The trace path itself may have trace path frequency information calculated for it as a weighted combination of the frequencies of the components lying on that particular trace path. The rarity or conversely, commonality, of that trace path respectively determines the identifiability or conversely, anonymity, of a particular data point. The trace path frequency and impact assessment may be combined in assessing the extent to which the explanation and the justification may thereafter be modified to accommodate the process of selective editing and deletion. The justification may include an explicit marker that HKI processes were involved in the creation of such modified answers. The process of selective deletion may allow neural networks and machine learning models to comply with privacy laws, right to be forgotten laws, and allow assertion of ownership rights over training data sets to take place effectively and in line with best practices in Europe, USA and the rest of the world.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for a distributed neural network architecture that is interpretable and explainable, comprising:
   an input layer configured to receive an input and identify one or more input features;
   a conditional network, comprising at least one of:
     a conditional layer configured to model the input features based on one or more partitions, wherein each of the one or more partitions comprises a rule;
     an aggregation layer configured to aggregate one or more rules into one or more aggregated partitions; and
     a switch output layer configured to selectively pool the aggregated partitions from the aggregation layer with the one or more partitions from the conditional layer;
   a prediction network comprising a plurality of local models, each local model in the plurality of local models comprising at least one of:
     a feature generation and transformation network comprising one or more transformation neurons configured to apply one or more transformations to the input features;
     a fit layer configured to combine features which have been transformed by the feature generation and transformation network to identify one or more coefficients related to at least one of: one or more features and one or more partitions;
     a value output layer configured to analyze the one or more coefficients and configured to output a value related to at least one of the one or more features or the one or more partitions;
   a synchronization layer configured to synchronize the plurality of local models into a global model, wherein each of the plurality of local models is configured to be trained independently, and the synchronization layer is configured to combine the trained local models into the global model;
   a parallel execution layer configured to activate one or more of the local models independent of the plurality of local models; and
   an output layer configured to generate an output which is interpretable and explainable by at least one of a machine program or a human;
   wherein one or more execution paths throughout the partitions are identifiable by an external process.

2. The system of claim 1, wherein the system is configured to form the global model based on the coefficients of the plurality of local models, wherein the system is configured to identify the coefficients of the plurality of local models independently of one another and wherein the synchronization layer averages the coefficients of the plurality of local models to form the global model.

3. The system of claim 1, wherein an output of the global model is equivalent to an aggregated output of the plurality of local models.

4. The system of claim 1, wherein one or more of the plurality of local models are weighted, such that the global model is formed based on a weighted average of the local models.

5. The system of claim 1, wherein each of the plurality of local models is configured to be independently activated and is fully explainable and interpretable.

6. The system of claim 1, wherein the plurality of local models is configured to be deleted or removed after the global model is formed.

7. The system of claim 1, wherein each one of the conditional network and the prediction network are implemented on one or more separate hardware circuits.

8. The system of claim 1, wherein one or more of: the input layer, the conditional layer, the aggregation layer, the switch output layer, the feature generation and transformation network, the fit layer, the value output layer, and the output layer are each separately implemented on separate devices in communication with one another.

9. The system of claim 1, wherein at least one of the conditional network and the prediction network is implemented as a hardware circuit, wherein the hardware circuit comprises one or more of an application specific integrated circuit (ASIC), analog circuit, digital circuit, optical-electrical circuit, field-programmable gate array (FPGA), computer processing unit, graphics processing unit, Neuromorphic computing hardware, and Quantum computing hardware.

10. The system of claim 1, further comprising a behavioral model, wherein the behavioral model comprises one or more behavioral conditions, behavioral events, behavioral triggers, and behavioral actions, wherein the behavioral model is based on the coefficients of one or more of the plurality of local models.

11. The system of claim 10, wherein the behavioral model is configured to identify a probability of activation of one or more of the execution paths throughout the partitions.

12. The system of claim 1, wherein the plurality of explainable models comprises more than one of: an explainable neural network (XNN), an explainable transducer-transformer (XTT), an explainable artificial intelligence (XAI), a convolutional XNN (CNN-XNN), a predictive XNN (PR-XNN), a text XTT (T-XTT), an explainable spiking network (XSN), explainable memory network (XMN), explainable reinforcement learning (XRL) agent, a sparse neural network, a dense neural network, and an interpretable neural network (INN).

13. A computer implemented method for inducing an explainable machine learning model, comprising executing on a processor the steps of:
splitting a set of data into a plurality of data parts,
inputting the plurality of data parts to a plurality of models, said data parts comprising at least one of training data and synthetic generated data;
recording at least one output of the plurality of models based on the data parts;
identifying a relationship between at least one input in the set of data and the at least one output, and generating a predicted output of the plurality of models;
modeling the predicted output of each of the plurality of models as a set of data points;
partitioning the data parts into a plurality of partitions;
fitting a plurality of local models to the plurality of partitions, wherein a local model in the plurality of local models corresponds to each partition in the plurality of partitions, wherein fitting the plurality of local models to the plurality of partitions comprises providing a local partition input to each partition in the plurality of partitions and receiving a local partition output for said each partition in the plurality of partitions, and further comprises formulating, for each of the partitions in the plurality of partitions, an equation with one or more coefficients and one or more features corresponding to said partition, wherein each of the one or more coefficients is assigned based on an importance of each of the one or more features in determining a final output, wherein the fitting of each of the plurality of local models occurs in parallel and wherein each of the plurality of local models are independently trained simultaneously on a plurality of distributed processors;
forming rules based on the plurality of local models;
representing the rules in a symbolic logic format;
forming a plurality of explainable models with the rules and the plurality of local models;
aggregating the plurality of explainable models into a global explainable model; and
generating and outputting, from the global explainable model, at least one explanation.

14. The method of claim 13, wherein the plurality of data parts are disjointed or overlapping.

15. The method of claim 13, wherein the coefficients of the global explainable model are based on a mathematical average of the coefficients of the plurality of explainable models.

16. The method of claim 13, wherein the aggregating the plurality of explainable models into a global explainable model further comprises identifying a plurality of weights associated with the plurality of explainable models and wherein the global explainable model is a weighted average of the local explainable models.

17. The method of claim 13, further comprising analyzing strength and weakness of each of the plurality of data parts, and wherein the global explainable model is a weighted average of the explainable models, wherein the explainable models are weighed based on the strength and weakness of the data parts associated with each explainable model.

18. The method of claim 13, wherein the aggregating the plurality of explainable models into a global explainable model further comprises implementing one or more of linear or non-linear combination functions and combinations of transformations.

19. The method of claim 13, wherein the aggregating the plurality of explainable models into a global explainable model further comprises discarding the local models once the global explainable model is formed.

20. The method of claim 13, further comprising:
receiving a set of new data,
splitting the set of new data into a plurality of new data parts
inputting the new data parts to one or more new models, said new data parts comprising at least one of training data and synthetic generated data;
recording at least one new output of the plurality of new models based on the new data parts;
identifying a relationship between at least one input in the set of new data and the at least one output, and generating a predicted output of the new model(s);
modeling the predicted output of the new model(s) as a set of data points;
partitioning the new data parts into a plurality of new partitions;
fitting a plurality of new local models to the plurality of partitions, wherein a new local model in the plurality of new local models corresponds to each partition in the plurality of new partitions, wherein fitting the plurality of new local models to the plurality of partitions comprises providing a new local partition input to each partition in the plurality of partitions and receiving a local partition output for said each partition in the plurality of new partitions, and further comprises formulating, for each of the partitions in the plurality of new partitions, an equation with one or more coefficients and one or more features corresponding to said partition, wherein each of the one or more coefficients is assigned based on an importance of each of the one or more features in determining a final output;
forming new rules based on the plurality of new local models;
representing the new rules in a symbolic logic format;
updating the global explainable model based on the new local models and the new rules.

21. The method of claim 13, further comprising receiving a set of instructions prior to splitting the set of data, wherein the set of instructions indicates a portion of the set of data and a permission indicator, wherein the permission indicator indicates whether the portion of the set of data is permissible to use or not,
wherein if the permission indicator indicates that the portion of the set of data is not permissible to use, the method further comprises removing the portion of the set of data from the set of data.

22. The method of claim 13, further comprising adding noise to one or more data parts, wherein the added noise is configured to obfuscate the one or more data parts, wherein the one or more obfuscated data parts comprise a set of private information.

23. The method of claim 22, wherein each local model is independently encrypted based on the noise added to the data parts, wherein each local model is configured to interface with the plurality of local models via a secure multi-party computation protocol.

24. The method of claim 13, further comprising encrypting one or more portions of the set of data, and decrypting the encrypted one or more portions of the set of data in a protected space.

25. The method of claim 24, wherein the generating and outputting at least one explanation is based on the encrypted portions of the set of data, and wherein the at least one explanation is subsequently decrypted independent of the encrypted portions of the set of data.

26. The method of claim 24, wherein encrypting the one or more portions of the set of data comprises at least one of:
generating, for homomorphic encryption, a private key and a public key, and homomorphically encrypting the set of data and the global explainable model based on the private key and public key; and
identifying a predetermined quantity of multiplications to perform on the set of data, and applying the predetermined quantity of multiplications on the set of data.

27. The method of claim 24, further comprising relinearizing the set of data and the global explainable model immediately after the step of encrypting the set of data and the global explainable model; and
rescaling the set of data and the global explainable model.

28. The method of claim 13, further comprising implementing the plurality of local models and the global explainable model on a quantum processing system, wherein the quantum processing system comprises a plurality of quantum specific extensions.

29. The method of claim 13, further comprising transmitting one or more tamper-proof records to an independent system of record, wherein the system of record is one or more of a distributed ledger, a private blockchain, a public blockchain, a secure audit database, a secure audit log system, a trusted platform module, a hardware secure module, a smartcard module, and a SIM card.

* * * * *